United States Patent [19]

Witman et al.

[11] 3,861,381

[45] Jan. 21, 1975

[54] DISPOSABLE RESPIRATOR

[75] Inventors: Ronald L. Witman, Sinking Spring; Guy G. Klinger, Shillington, both of Pa.

[73] Assignee: ESB Incorporated, Philadelphia, Pa.

[22] Filed: Apr. 2, 1973

[21] Appl. No.: 346,991

[52] U.S. Cl. ............................................ 128/146.6
[51] Int. Cl............................................. A62b 23/00
[58] Field of Search............ 128/146.6, 146.7, 143.3, 128/146.2, 146, 142.6, 141; 55/514, 524

[56] References Cited
UNITED STATES PATENTS
2,922,417  1/1960  Bradley et al................... 128/141 R
3,316,904  5/1967  Wall et al. ........................ 128/146.6
FOREIGN PATENTS OR APPLICATIONS
442,725  2/1936  Great Britain...................... 128/146

Primary Examiner—Richard A. Gaudet
Assistant Examiner—Henry J. Recla

[57] ABSTRACT

A respirator is described in which the shell portion joins the filter mat by a unique juncture wherein portions of the filter mat are mechanically bonded to the material of the shell and other portions of the mat may be attached by welding or chemical bonding to the material of the shell. The mechanical bonding is obtained by molding the shell into and around the edges of the filter mat. The welding is obtained by the incorporation of selected materials in the filter that heat weld to the material of the shell when the latter is molded about the former. The materials of shell and filter mat may be chosen to be pliant and flexible thereby providing a respirator that is adaptable to the static and dynamic facial contours of the user. Because of the molded construction of the respirator, it can be made at a low cost. In the manufacture of the filter mat shell joint, it is important that the mat be sealed off at the boundary of the joint area to prevent molten shell material from penetrating too far into the filter mat.

9 Claims, 10 Drawing Figures

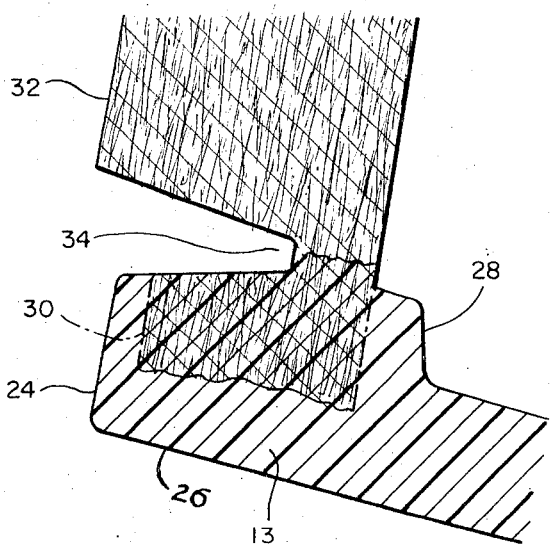
Fig. 5
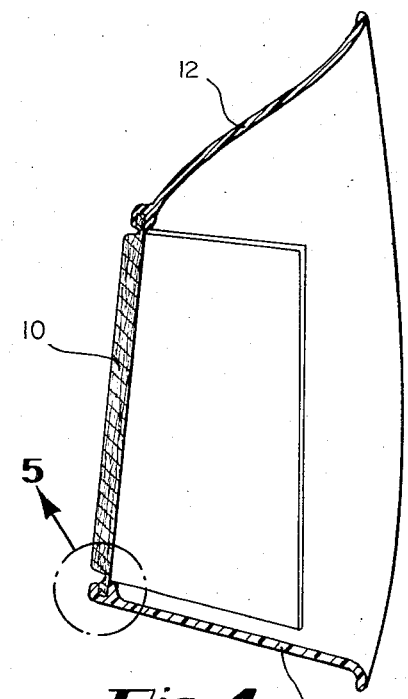
Fig. 4
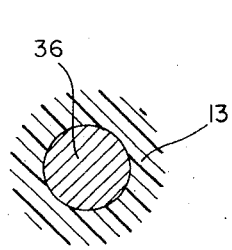
Fig. 6
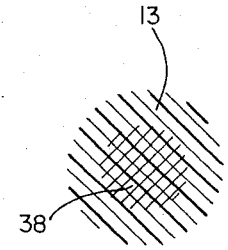
Fig. 7
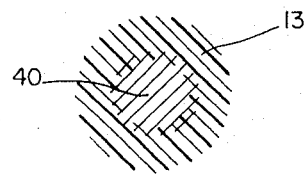
Fig. 8
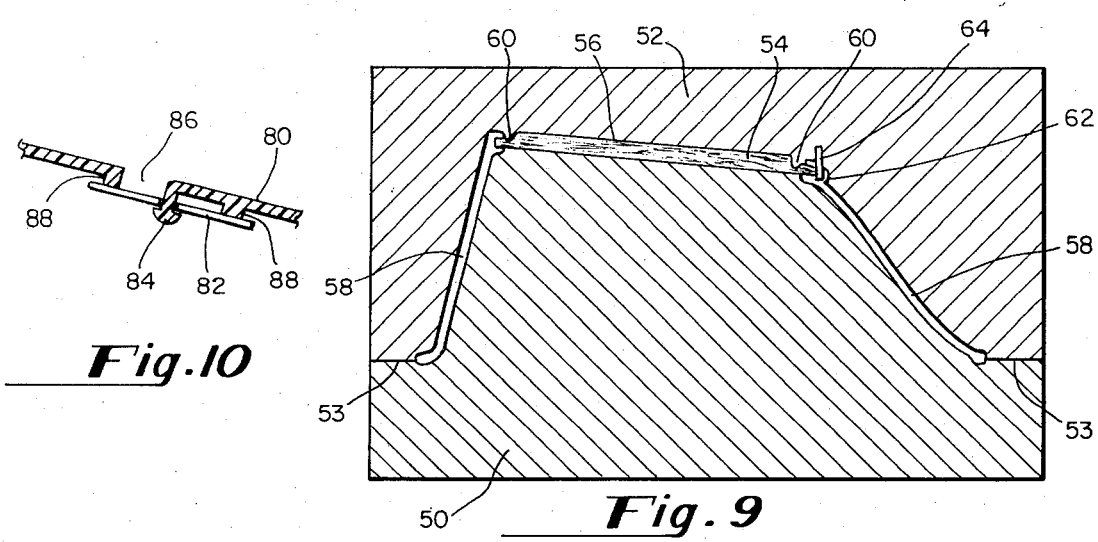
Fig. 10
Fig. 9

# DISPOSABLE RESPIRATOR

BACKGROUND OF THE INVENTION

1. Field of the Invention

This invention relates to breathing respirators for hazardous atmosphere. In particular, it relates to a respirator wherein the filter element and the shell are permanently fastened together.

2. Description of the Prior Art

Many respirators used in industry comprise a face mask or shell which envelops the nose and mouth of the wearer, and a replaceable filter element forming a part of or connected to the shell. Respirators of this type are excellent for repetitive work, where a worker must wear a protective device for some or all of his work period every day, and are used in large quantities by industry. Another form of respirator is the disposable type. By disposable is meant that when the filter has served its usefulness, the entire respirator is cast away. An example of this type is a filter element alone, held over the nose and mouth of the user by head straps, such as used by the medical profession. It has been found that this simple type does not give very good protection because it does not properly fit the contours of the face. Also the filter rapidly absorbs perspiration from the face of the user, distorting the edge, making it uncomfortable to wear and reducing the effective filter area. Disposable masks have been made having a face fitting shell and a filter pad attached thereto. In some masks of this type, a metal framework is used to attach the filter to the shell. This makes the shell stiff and not easily adaptable to the contours of the users face. In certain others of this type a plastic frame is used having a filter cemented thereto. These have somewhat more flexibility than the respirators having a metal framework.

To provide acceptable protection, the mask must not only fit tightly to the face of the user when the user is static but it must also provide a seal when the user's face is moving such as occurs when he talks, etc. Masks having a stiff frame do not seal well under such conditions.

Disposable masks are desirable for occasional use, where it is more desirable to dispose of the article after a use period than to store it. They would also be preferred for full time use if technically and economically equivalent to the replaceable filter type respirators. An advantage of the disposable respirator compared to a replaceable filter respirator is that the former is new and clean when put to use whereas the replaceable respirator may not be. For proper sanitation, the respirator of the replaceable filter type must be hygenically cleaned after each use period. Also, with the replaceable type respirator, the filter elements must be replaced at regular intervals, the headbands must be regularly checked and replaced as required, the valves and valve covers must likewise be checked and replaced in order to insure that the respirator is a reliable workable device. Trained personnel must be provided for this work and a parts inventory must be set up. The routine maintenance and inspection required adds to the operational cost of the replaceable filter-type respirator. Thus, a disposable respirator may be competitive in operational costs even though its selling price is greater than the price of the filter replacement of a conventional respirator. However, to make the disposable unit acceptable to the user, it must be both comfortable and tight fitting.

Respirators of the replaceable filter type have projecting cans or fittings which can catch or otherwise interfere with the user's actions. The filter cannister often interferes with the vision of the user. Many respirators of the replaceable type interfere greatly with vocal communications by the user.

Respirators are made with and without exhalation valves. The valveless type has the advantage of simplicity, economy, and light weight. It has been found that the valveless type tends to retain heat and moisture within the shell making it uncomfortable for extended use periods. Many respirators are supplied with exhalation valves. Respirators having exhalation valves allow for the escape of most of the heat and moisture in the user's breath. They are therefore preferred for full time use, whereas the valveless type are recommended for short time use or conditions where humidity and temperature are not a problem.

SUMMARY OF THE INVENTION

A respirator shell made of a soft pliant impervious material is integrally molded to an air pervious fiberous filter element. During the molding, the shell material is made to flow around individual fibers of the filter to provide a mechanical joining of the shell and filter. Some or all of the fibers of the mat made by made of the same material as the shell or materials compatable therewith so that during the molding operation these fibers are heat welded or chemically bonded to the material of the shell. The mold which shapes the shell and holds the filter during molding is provided with compression areas which pinch off the major portion of the filter while allowing the material of the shell to penetrate a predetermined distance into the filter thereby encapsulating and sealing the edges of the filter and joining it to the shell. Support pins may be used in the mold to locate the filter prior to the molding operation.

It will be seen from this brief summary that a unitized respirator is described which can be light, extremely flexible for best facial fit, which provides a maximum of filter area, which shows very little vocal loss or distortion, and which can be readily made at a low cost so that it can compete costwise with the classical replaceable elemenet respirator. The respirator may be equipped with an exhalation valve if it is desirable.

BRIEF DESCRIPTION OF THE DRAWINGS

FIG. 4 shows the cross section 4–4 of the mask of FIG. 1;

FIG. 5 shows an enlarged view of a portion of the joint of FIG. 4;

FIG. 6 shows in enlarged cross section a first form of union between filter fiber and respirator shell material;

FIG. 7 shows a second form of union;

FIG. 8 shows a third form of union;

FIG. 9 shows a cross section of a typical mold used to form the respirators of the invention; and FIG. 10 depicts in cross section a respirator valve as used with certain embodiments of the invention.

DESCRIPTION OF THE PREFERRED EMBODIMENT

Figure 1:
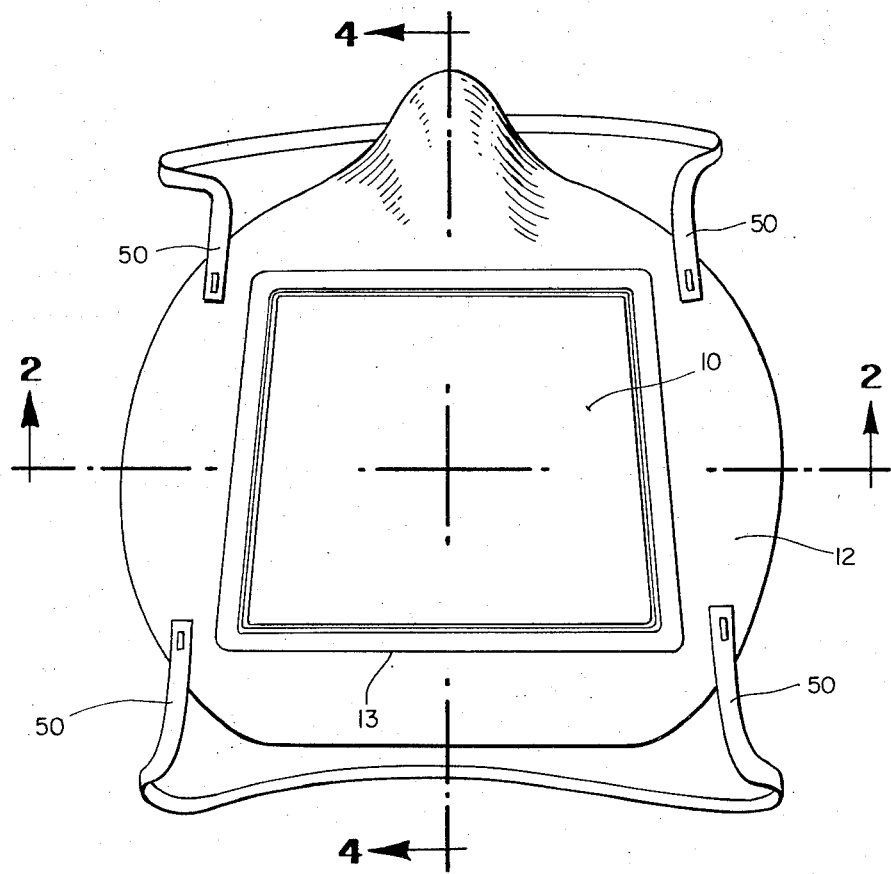
FIG. 1 shows a front view of the respirator of the invention.

An air pervious respirator filter 10, FIG. 1 is chosen to have suitable characteristics for the particular atmospheric hazard against which the respirator will be used. Typical hazardous atmospheres for which respirators provide protection include: toxic dusts, pneumoconiosis producing dusts, radioactive dusts, toxic mists, pneumoconiosis producing mists, radioactive mists, fumes and vapors, and other hazardous conditions.

Filter mats may be chosen to be specific for one or more of these hazards or they may be chosen to provide general protection against all normal filterable hazards. The filter mat may comprise several layers of material, each layer having a particular property. Filter mats may be made from natural fibers, synthetic fibers, non organic fibers or microporous sheet. The filter mat may be woven, felted or otherwise prepared. It is desirable to have as large a filter area as possible so that there is a minimum restriction to breathing.

Combined with the filter action, the material from which it is made may also have certain additional characteristics to be described.

12, FIG. 1, represents a respirator shell molded from a pliant material. For example, some suitable materials for the shell include synthetic rubbers, polypropylene, polyethylene, and plasticized polyvinyl chloride. The filter is attached to the shell by integrally molding the shell about the periphery of the filter. Because of the nature of the materials of which the joint between shell and filter is made, namely a collection of individual fibers on the one hand and a liquid turned solid on the other, the joint between shell and filter has certain distinctive features not necessarily found in other joints.

Figure 2:
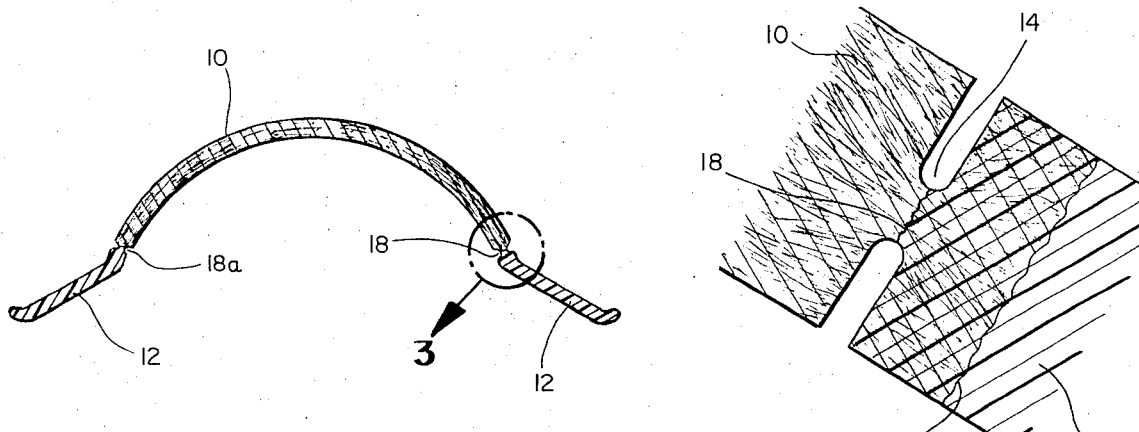
FIG. 2 shows the cross section 2–2 of FIG. 1.
Figure 3:
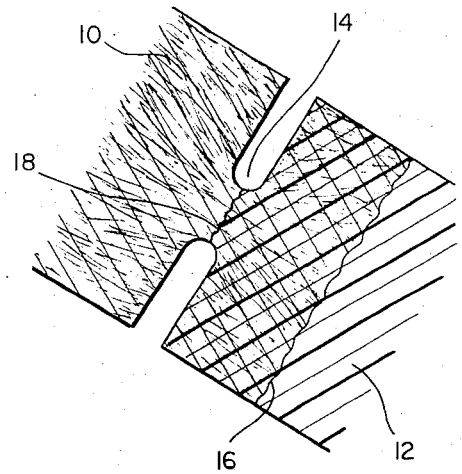
FIG. 3 shows an enlarged view of the joint between the injection molded portion of the shell and the filter element.

FIG. 2 shows a cross sectional view of the respirator of FIG. 1 taken at the line 2—2. The shell 12 is shown joined to the Filter 10 by the weld circled at 3. A greatly enlarged view of the joint is shown in FIG. 3.

It has been found that a piece of filter is placed in a mold and the mold filled with liquid plastic as performed in the usual injection molding operation, the pores of the filter will be completely filled to give a fiber-reinforced solid. In this case the filter is no longer pervious to air and is therefore unusable. In the seal of the invention a continuous circumferential portion of the filter in the vicinity of its periphery is compressed as at 14, to the point where it is no longer porous to the melted plastic, thus preventing the penetration of shell material into the working area of the filter during the molding operation. Line 16 depicts the edge of the filter 10. Line 18 depicts the limit of the penetration of plastic into the filter. The area between 16 and 18 represents a solid area containing both filter fibers and plastic material, this solid area forming the joint between filter and shell. The area of the filter from line 18 to a similar line 18a (FIG. 2) on the opposite side includes only filter material and is the working area of the filter.

Certain types of fiber having a high melting point will be unchanged when the hot liquid plastic is injected around them. These fibers will be held by the plastic of the shell in a mechanical joint. Fibers of a second type will melt and in melting weld more or less extensively with the plastic of the shell. A third type of fiber will chemically bond to the plastic of the shell under the influence of heat and pressure, but also dependent upon the choice of materials used for the shell and the filter fibers.

Examples of the first type of fiber are:
cellulose fiber (paper, cotton, viscose, etc.)
animal fibers — wool, hair, etc.
untreated glass fibers
carbon and graphite fibers
fluorinated hydrocarbon fibers having high melting points such as tetrafluoropolyethylene, etc.

Examples of the second type of fiber are:
orlon
nylon
polyester
polypropylene, etc.

An example of the third type of material is glass fiber having a chemically reactive silane coating.

Another class of filter suitable for use in the invention comprises an air pervious porous or microporous sheet. Porous sheets are available made from materials such as:
polyvinyl chloride
polyethylene
polytetrafluoroethylene, etc.

It is an important feature of the present invention that both as an aid to obtaining desirable filter characteristics and in order to get the most secure joint that the filter may comprise a mixture, blend or a combination of filter fibers and filter types. Likewise it may be desirable to form the filter from two or more filter sheets each sheet having specific properties.

In FIG. 4 depicting a cross section of the respirator of FIG. 1 along the line 4—4, a slightly modified joint 5 is shown. In this joint, shown in enlarged form in FIG. 5, the material of the shell is formed so as to envelop the joint area on three sides, 24, 26 and 28 rather than on one side or one edge as shown in FIGS. 2 and 3. A further modification of the joint is also shown in FIG. 5. In this instance, the filter has been preformed prior to the molding operation so as to reduce the thickness of the material in the joint area 30 compared to the normal thickness of the filter as shown at 32. The preforming compaction or partial fusion of the filter edge may be effected by the action of pressure or pressure plus heat on the edge of the filter. Groove 34 serves to compact the filter so as to limit the flow of plastic to the joint area and prevent it from running into the filter area 32. In FIG. 6 a single fiber 36 is shown mechanically held by the material of the shell 13. In FIG. 7, a single fiber 38 is shown welded to the shell 13. In FIG. 8, another single fiber 40 is shown surrounded by and chemically bonded to the shell.

In the manufacture of the respirator of the invention, a piece of filter mat is cut to an exact size. The edges of the mat may be compacted by pressing in a die with or without heat to provide a preform. The filter, with compacted or uncompacted edges is placed in and is encased by a mold such as that shown in cross section in FIG. 9. This cross section is taken at a point corresponding to 4—4 of FIG. 1. In FIG. 9, 50 represents the bottom piece of the mold and 52 represents the top piece. The parting joint 53 separates the two mold pieces. A filter preform 54 is shown located in a filter portion of the cavity 56 of the mold. An additional cavity portion 58, is formed to the shape the respirator shell. Cavity 58 will be filled with a non pervious plastic material to form the shell. Near the edges of the filter portion of the mold cavity 56 a ridge of metal 60 is formed. This ridge may be part of or a piece of metal attached to the top of the mold as shown. It may be a part of the bottom of the mold or a ridge may be formed on both top and bottom of the mold. The purpose of the ridge 60 is to compress the portion of the filter mat lying between the ridge and the opposite portion of the mold to the point where the filter mat becomes impervious to the plastic material at the time of molding. It is important that the ridge does not press too hard on the filter mat as it then can cut or otherwise damage the mat, rendering it unfit for use. If the mat is not sufficiently compressed, the plastic material can flow through and fill or partially fill the void area of the filter mat thus rendering it unfit for use. The exact amount of compression needed is dependent upon such factors as the porosity of the filter, the temperature, pressure, viscosity, and type of the liquid shell material, and the mold temperature, etc. It normally is somewhat less than the exact porosity of the filter.

It is also desirable that the corners of the ridge 60 are rounded so as to reduce any tendency to cut the fibers of the mat.

The one or more ridges 60 taken in combination with the filter effectively divides the mold cavity into the two portions 56 and 58 described above.

When the filter mat is properly located in the mold, the outer portion of the periphery extends into the portion 62 of the mold cavity.

A further benefit of the construction described is that with a proper compression of the filter 54 by the ridge 60, the filter, though holding the liquid plastic within the shell portion 58, still allows for some passage for air and provides the venting required to give a satisfactory plastic part. It is well known in the plastics mold making art that vents must be provided in plastic molds so that the air originally in the mold can be displaced. If vents are not provided the air will be entrapped in the finished plastic article.

To assist in the positioning of the filter in the mold, a plurality of location pins such as that shown at 64 may be positioned in one or both mold parts 50 and 52. Ordinarily when locating pins are used in a mold they tend to leave undesirable passages in the molded part. It is a peculiarity of the present system that the holes left by location pins to not produce undesirable leakage points. This is because although they touch and guide the filter 54, the filter is normally rendered impervious by the injected plastic in the area where the pin 64 is located. If the filter should not be blocked off in the area, it will still act to filter air passing therethrough.

After the filter has been placed in the mold and the mold closed, hot thermoplastic material is injected under pressure into the mold cavity 56. The hot material surrounds and melts into the periphery of the filter giving a joint that is a mechanical interlock of the fibers of the filter with the thermoplastic. If some or all of the fibers of the filter are chosen to be the same as or compatible with the material of the shell, the material of the shell will fusion weld or heat fuse to these particularized fibers. By fusion welding or heat fusing is meant the melting together of shell material and fiber so that upon cooling the shell material and the fiber are homogeneously bonded.

In a first example, a filter may be chosen made of a blend of natural cotton and propylene felt. A shell of polypropylene is injection molded about the filter. In this case the cotton fiber is mechanically bonded to the shell whereas the propylene fibers will be welded to the shell.

In a second example, a filter is chosen having a filter of paper supported between two layers of glass fabric. The glass is treated with a silane to improve the weave. A shell of styrene butadiene is molded thereto. In this case, the paper is mechanically bonded to the shell and a chemical bond is formed between the shell and the silane coating on the glass fiber.

For convenience, the filter section of the respirator is best made in the form of a plane, a sheet of revolution (cone cylinder, etc.,) or combination of these surfaces so that the filter can be cut from a flat sheet.

It may be desirable to include an exhalation valve such as shown in cross section in FIG. 10, in the respirator of the invention. A convenient location for this is in the area of the shell indicated by 13 in FIGS. 1 and 4. In FIG. 10, 80 represents the shell of the respirator. 82 is a pliant valve member attached to the shell by stud 84. Valve member 82 in its normal position closes one or more ports 86 by contact with seat 88. When the pressure within the respirator is greater than the external pressure the valve opens and allows the air within to escape.

It will be noted that the joint and seal between filter mat and shell of the present invention provides maximum strength and requires a minimum of filter area. Because of the strength of the joint the filter should not need additional support. This differs from certain presently available respirators which have to have a support framework to prevent collapse of the filter mat during use. The framework adds weight, reduces the flexibility of the mask and also reduces the available filter area.

By the use of the present joint between shell and filter a number of unexpected benefits have been found. A first benefit is the extreme flexibility of the mask. This is due partly to the absence of any framework and partly due to the strength of the joint. It allows the respirator to conform to extremes in facial characteristics and facial movement of the user.

A second benefit is that the filter blends smoothly into the contours of the shell without any projecting parts. Therefore, the mask does not tend to catch on obstructions or tangle in wires, etc.

A third benefit is that the mask can be designed to fit close to the face of the user so that there is practically no interference with the user's vision.

A fourth benefit is that because the passage from mouth to filter is short and wide there is little if any alteration or attenuation of the voice of the user. He can talk clearly through the mask and his voice will sound unmuffled.

Finally, it is low in cost, so that it can be used as a throw-away item at a cost competitive with a replaceable filter-type respirator. The improved cleanliness of the throw-away item compared to the replaceable filter type respirator provides a broadened appeal both to the user and to health and safety authorities.

Having described our invention and pointed out its differences from other respirators presently available, we hereby claim:

1. In a respirator of the type having a fibrous mat filter element, a respirator shell portion and a joint portion the joint portion uniting the shell portion and the filter element, the improvement which comprises: the inclusion in the joint portion of a solid area containing both shell material and filter fibers and fusion welds between fibers of the filter element and the material of the shell portion.

2. A respirator as defined in claim 1 wherein the material of the fibers which fusion weld is selected from the group which consists of orlon, nylon, polyester and polypropylene and the material of the shell is selected from the group which consists of polypropylene, polyethylene, and plasticized polyvinyl chloride.

3. A respirator as defined in claim 1 wherein a continuous circumferential area of the filter element in the vicinity of its perifery is compressed, the portion of the filter element within the compressed area being a working area containing filter material alone and the portion of the filter element outside the compressed area along with shell material forming the joint portion of the respirator.

4. A respirator as defined in claim 1 wherein the joint section also includes fibers held to the shell portion by chemical bonds.

5. A respirator as defined in claim 1 wherein shell material in the solid joint area surrounds the perifery of the filter element.

6. A respirator as defined in claim 5 wherein when the joint portion is viewed in cross section the shell material envelopes the joint area on three sides thereof.

7. A respirator as defined in claim 1 wherein the joint section also includes fibers held to the shell portion by mechanical joints.

8. A respirator as defined in claim 7 wherein the material of the fibers which are held to the shell by mechanical means is selected from the group which consists of cellulose fiber, animal fibers, untreated glass fibers, carbon fibers and graphite fibers.

9. A respirator of the type having a fibrous mat filter element, the fibrous mat including fibers of a thermoplastic material, a respirator shell portion, comprising a thermoplastic material, and a joint portion, the joint portion uniting the shell portion and the filter element wherein in the joint portion the said thermoplastic fibers are heat fused to the shell portion.

* * * * *